United States Patent
Zhang et al.

(10) Patent No.: US 8,308,977 B2
(45) Date of Patent: Nov. 13, 2012

(54) METHODS AND SYSTEMS FOR MONITORING AND CONTROLLING SURFACTANT CONCENTRATION IN LIQUID CRYSTAL COLLOIDAL DISPERSIONS

(75) Inventors: Ke Zhang, Stow, OH (US); Hari Mukunda Atkuri, Kent, OH (US); John L. West, Hartville, OH (US)

(73) Assignee: Kent State University, Kent, OH (US)

( * ) Notice: Subject to any disclaimer, the term of this patent is extended or adjusted under 35 U.S.C. 154(b) by 356 days.

(21) Appl. No.: 12/579,518

(22) Filed: Oct. 15, 2009

(65) Prior Publication Data

US 2011/0089382 A1  Apr. 21, 2011

(51) Int. Cl.
C09K 19/52 (2006.01)
C09K 19/54 (2006.01)
G01N 1/38 (2006.01)
B01F 3/12 (2006.01)

(52) U.S. Cl. .......... 252/299.01; 252/299.5; 977/840; 356/36; 516/31

(58) Field of Classification Search .......... 252/299.01, 252/299.5; 977/700, 840; 356/36; 516/31
See application file for complete search history.

(56) References Cited

U.S. PATENT DOCUMENTS 7,758,773 B2 *  7/2010  West et al. ........ 252/299.01
2007/0200093 A1  8/2007  West et al.

OTHER PUBLICATIONS

Kurochkin et al., "A colloid of ferroelectric nanoparticles in a cholesteric liquid crystal", J. Opt. A: Pure Appl. Opt. 11, pp. 1-5 (Feb. 2009).*

Li et al., "Ferroelectric nanoparticle/liquid-crystal colloids for display applications", Journal of the SID 14/6, , pp. 523-527, 2006.*
S. Kaur et al., "Enhanced Electro-Optical Properties in Gold Nanoparticles Doped Ferroelectric Liquid Crystals", Applied Physics Letters, 2007, pp. 023120/1-023120/3, vol. 91.
Y. Shiraishi et al., "Frequency Modulation Response of a Liquid-Crystal Electro-Optic Device Doped with Nanoparticles", Applied Physics Letters, 2002, pp. 2845-2847, vol. 81.
M. Suzuki et al., "Polarizerless Nanomaterial Doped Guest-Host LCD Exhibiting High Luminance and Good Legibility", Mol. Cryst. and Liq. Cryst. 2001, pp. 191-196, vol. 368.
I. C. Khoo, "Holographic Grating Formation in Dye- and Fullerene C60-Doped Nematic Liquid-Crystal Film", Optics Letters, 1995, pp. 2137-2139, vol. 20, No. 20.
H. Chen et al., "Faster Electro-Optical Response Characteristics of a Carbon-Nanotube Nematic Suspension", Applied Physics Letters, 2007, pp. 033510/1-033510/3, vol. 90.
F. Haraguchi et al., "Reduction of the Threshold Voltages of Nematic Liquid Crystal Electrooptical Devices by Doping Inorganic Nanoparticles", Japanese Journal of Applied Physics, 2007, pp. L796-L797, vol. 46, No. 34.

(Continued)

Primary Examiner — Shean C Wu
(74) Attorney, Agent, or Firm — Hahn Loeser + Parks LLP; Scott M. Oldham

(57) ABSTRACT

There are provided methods and systems for precisely controlling the surfactant concentration and character of ferroelectric nanoparticles in a ferroelectric liquid crystal dispersion. In an aspect, the invention provides an efficient FTIR technique to characterize the status and measure the distribution of the surfactant in ferroelectric particle dispersion. This allows for establishing a reproducible fabrication process for ferroelectric nanoparticle liquid crystal dispersions. The methods also maintain the nanoparticles ferroelectricity, which is provided by the addition of surfactant during a comminution process. The invention therefore optimizes both the milling time (to achieve small particle size and narrow size distribution) and surfactant concentration (to maintain the ferroelectricity during milling).

20 Claims, 13 Drawing Sheets

OTHER PUBLICATIONS

O. Buluy et al., "Preparation and Properties of a Ferromagnetic Nematic Suspension", Institute of Physics, Nat. Acad. Sci. of Ukraine, 2004, pp. A48-A50, vol. 49, N 12A.

M. E. Lines et al., "Principles and Applications of Ferroelectrics and Related Materials", Clarendon Press, 1977, pp. 117-119, p. 128, p. 531, Oxford.

Yu. Reznikov et al., "Ferroelectric Nematic Suspension", Applied Physics Letters, Mar. 24, 2003, pp. 1917-1919, vol. 82, No. 12.

C. I. Cheon et al., "Electro-Optics of Liquid Crystals Doped With Ferroelectric Nano-Powder", SID Symp. Digest Tech Papers, 2005, pp. 1471-1473, vol. 36.

F. Li et al., "Orientational Coupling Amplification in Ferroelectric Nematic Colloids", Physical Review Letters, 2006, pp. 147801/1-147801/4, vol. 97.

F. Li et al., "Erratum: Orientational Coupling Amplification in Ferroelectric Nematic Colloids", 2007, p. 219901, vol. 99.

D. H. Lee et al., "FTIR Spectral Characterization of Thin Film Coatings of Oleic Acid on Glasses: Part II Coatings on Glass from Different Media such as Water, Alcohol, Benzene and Air", Journal of Materials Science., 2000, pp. 4961-4970, vol. 35.

L. Zhang et al., "Oleic Acid Coating on the Monodisperse Magnetite Nanoparticles", Applied Surface Science, 2006, pp. 2611-2617, vol. 253.

D. H. Lee et al., "FTIR Spectral Characterization of Thin Film Coatings of Oleic Acid on Glasses: I. Coatings on Glasses from Ethyl Alcohol", Journal of Materials Science, 1999, pp. 139-146, vol. 34.

* cited by examiner

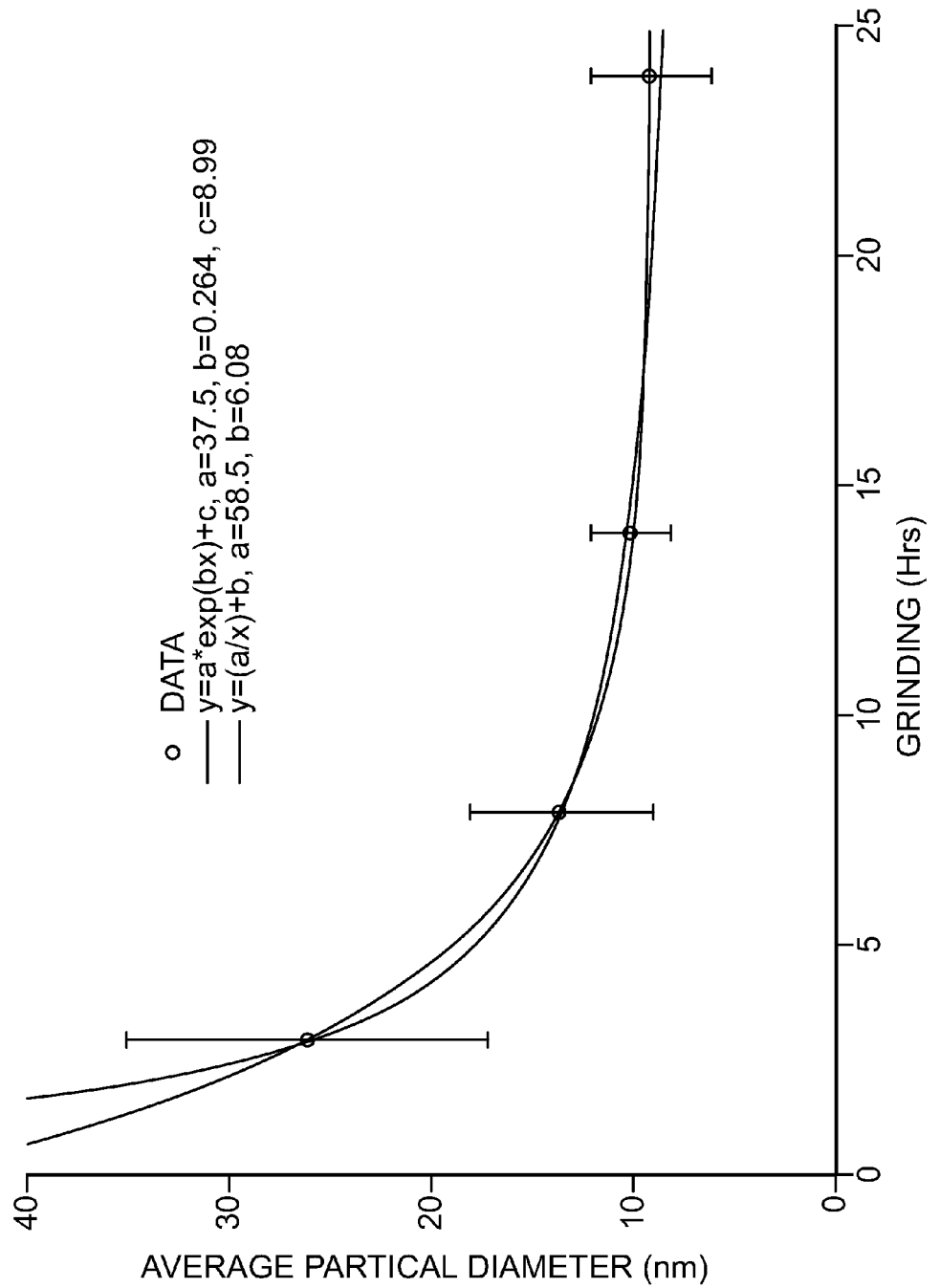

METHODS AND SYSTEMS FOR MONITORING AND CONTROLLING SURFACTANT CONCENTRATION IN LIQUID CRYSTAL COLLOIDAL DISPERSIONS

TECHNICAL FIELD

There is provided methods and systems for monitoring and controlling surfactant concentrations in liquid crystal colloidal dispersions to maintain and enhance stability of the dispersion and effectively provide properties of ferroelectric liquid crystal colloids without degradation.

BACKGROUND

The dispersion of nanoparticles into liquid crystals (LCs) has been performed as a method to enhance the properties of LCs and produce new functional materials. It has been found that as the particle size reaches to the nanometer scale, ($10^{-7}$-$10^{-9}$ m.), wherein they are close to the size of LC molecules, the surface anchoring induced elastic distortion of the particles is diminished. At this point, the particle's intrinsic properties become more influential in determining the properties of the LC nanocolloids. Various nanoparticles of different types have been attempted, including metal, fullerene, carbon nanotube, inorganic MgO or SiO, ferromagnetic and others. The formation of dispersions using such materials in conjunction with LCs can provide various features to the LC hosts.

In an example, dispersions of ferroelectric nanoparticles have been produced, with the nanoparticles having enormous dielectric constants in their single crystals. By dispersing low concentrations of ferroelectric nanoparticles into LCs, there has been formed ferroelectric nanocolloidal liquid crystals (FNCLCs) which exhibit significantly enhanced dielectric, and optical properties, such as for LC displays or other applications. Because these types of nanoparticles produce no defects the particles are generally uniformly dispersed in the LC host. The new FNCLCs appear as stable and as homogenous as the pure LC, and may be useful in a variety of applications, replacing conventional liquid crystal formulations.

At the same time, it has been found that the properties of the ferroelectric nanoparticles are extremely sensitive to their preparation techniques and conditions. For example, the techniques in grinding the materials to form the nanoparticles can have an impact on their properties. Further, as with other particle dispersions, coverage of the particles with a surfactant can reduce the particle aggregation and enhance the stability of suspension. Further, with the ferroelectric nanoparticles, a surfactant layer may facilitate maintaining the ferroelectricity of the particles. However, excess surfactant suppresses the order parameter of the liquid crystal and adversely impacts the effect of the ferroelectric particles. Therefore, it is important to precisely control the surfactant concentration during the manufacturing process in order to optimize the properties of ferroelectric liquid crystal colloids.

At present, commercial ferroelectric nanopowders are used as ingredients for making ferroelectric ceramic materials. They are generally pulverized from large crystalline material, and sieved to a nominal size range. Most of these particles lose their ferroelectricity due to strong mechanical collisions in this process during milling. If there is any remaining, their strong dipolar moment can induce severe agglomeration over a μm scale. These powders need to be compounded with binding material and sintered at high temperature (>1000° C.). Usually a high voltage (>kV) poling is performed as a post treatment. These post treatments help to restore the ferroelectricity lost during pulverization process. However, both these treatments are difficult to be realized in association with FNCLCs, where nanosized particles were mixed with liquid crystals.

SUMMARY

In this invention, methods and systems for precisely controlling the surfactant concentration and character of ferroelectric nanoparticles is set forth. In an aspect, the invention provides an efficient Fourier Transform Infrared spectroscopy (FTIR) technique to characterize the status and measure/monitor the distribution of the surfactant in ferroelectric particle dispersion. This allows for establishing a reproducible fabrication process for ferroelectric nanoparticle liquid crystal dispersions. In an example, an oleic acid (OA) may be used as the surfactant and the method, according to an example, is based on an OA absorption band. However, this method can be modified and applied to other particle dispersions when the surfactant level needs to be controlled.

BRIEF DESCRIPTION OF THE DRAWINGS

FIG. 15 is a graph showing TEM analysis of average particle diameter as a function of grinding time.

DESCRIPTION OF THE DRAWINGS

Figure 1:
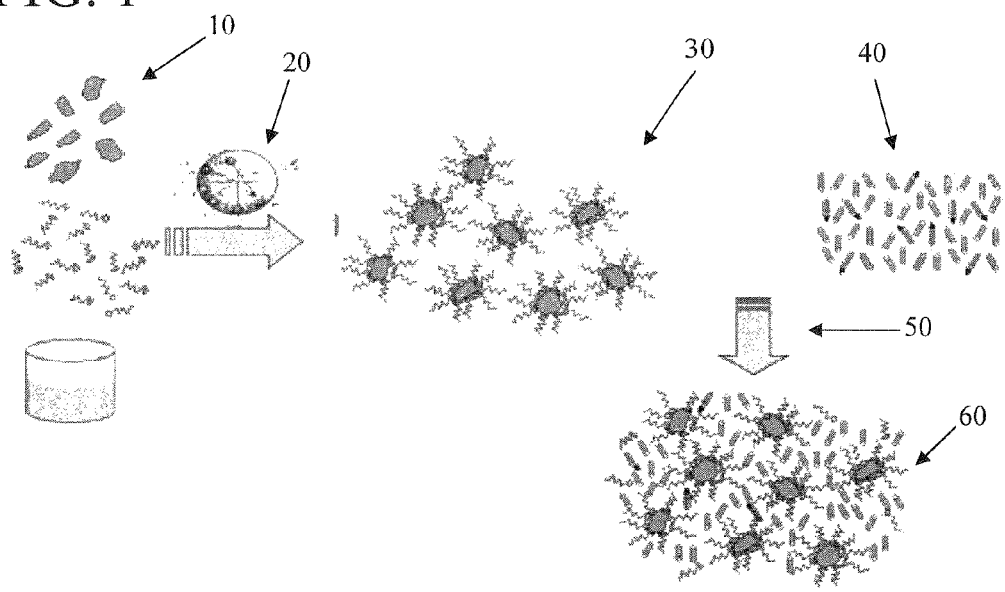
FIG. 1 is an illustration of the fabrication process of a ferroelectric liquid crystal dispersion and ferroelectric nanocolloidal liquid crystals.

As mentioned previously, current ferroelectric nanopowders are generally produced using post treatments to restore the ferroelectricity lost during pulverization process. However, as both these treatments are difficult to be realized in association with FNCLCs, where nanosized particles were mixed with liquid crystals, other techniques are used to produce fresh ferroelectric nanoparticles which are mixed with a LC host material. Once the nanoparticles are produced, they are mixed with the LC host soon thereafter, such as within hours after production, to reduce the chance of aggregation. As shown in FIG. 1, in an example, the production of FNCLCs includes mixing ferroelectric nanoparticles, with a surfactant such as oleic acid (OA) and a liquid carrier such as a solvent at 10, and comminuting the mixture for a predetermined time at 20. This comminuting process (such as grinding), coats the nanoparticles with the surfactant material at 30, which can then be mixed with liquid crystal host material at 40 along with heating of the mixture at 50 to form the liquid crystal and nanoparticle suspension at 60.

The enhancement of liquid crystal properties (like phase transition temperature, dielectric anisotropy, and birefringence) may be caused by the increase of the order parameter resulting from liquid crystal molecules being aligned by the strong local electric field associated with ferroelectric nanoparticles. In order to achieve this effect, several conditions need to be met simultaneously: 1) the particles need to be large enough to possess significant dipole moment; 2) this dipole moment can be felt by the neighboring liquid crystal molecules; the particles need to be small enough to avoid the formation of defects; 3) there must be enough surfactant to coat the particles; and 4) there must not be excess free surfactant which will reduce the order parameter.

Figure 2:
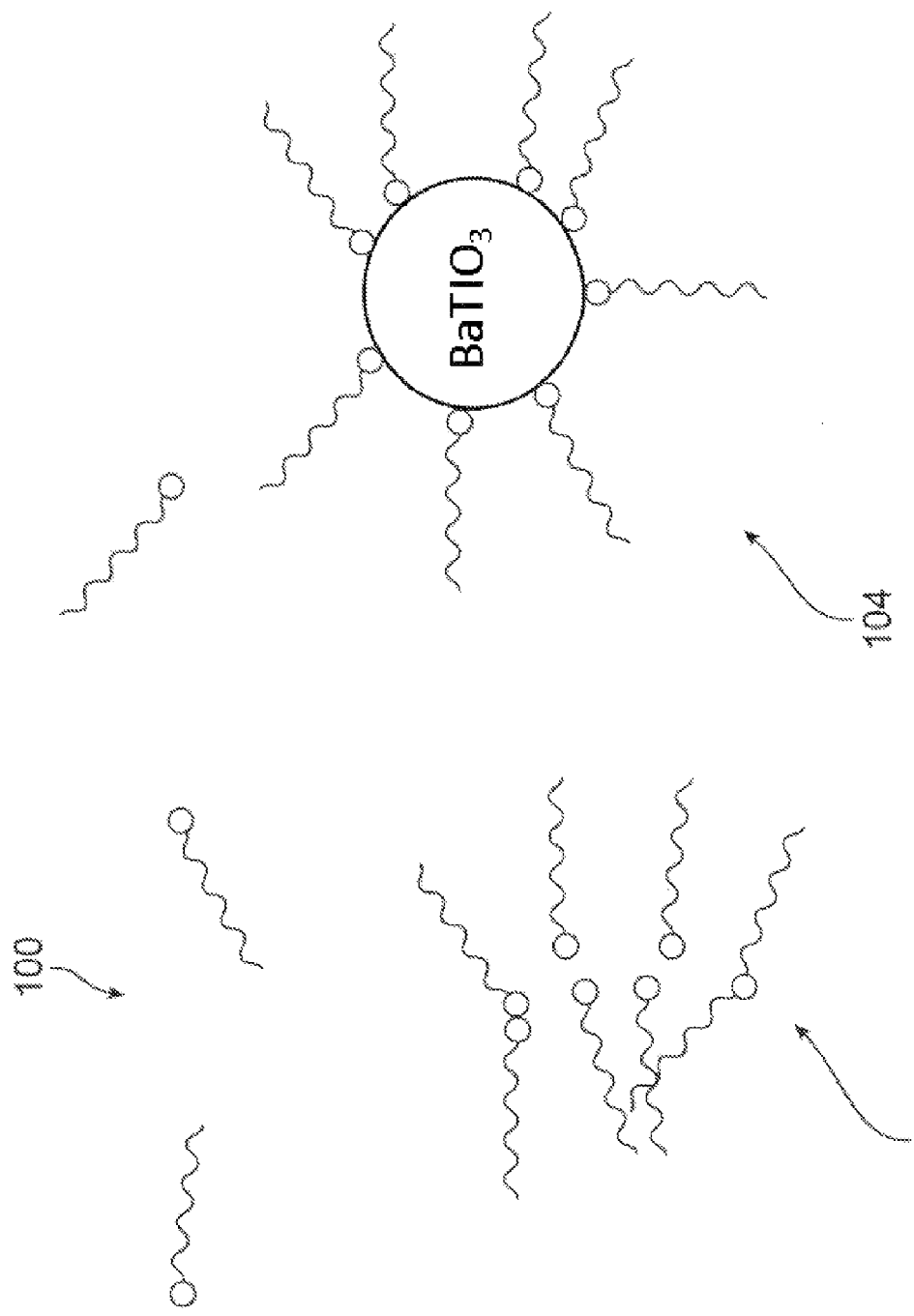
FIG. 2 is an illustration of three states of oleic acid in a $BaTiO_3$ particle dispersion according to an example.
Figure 3:
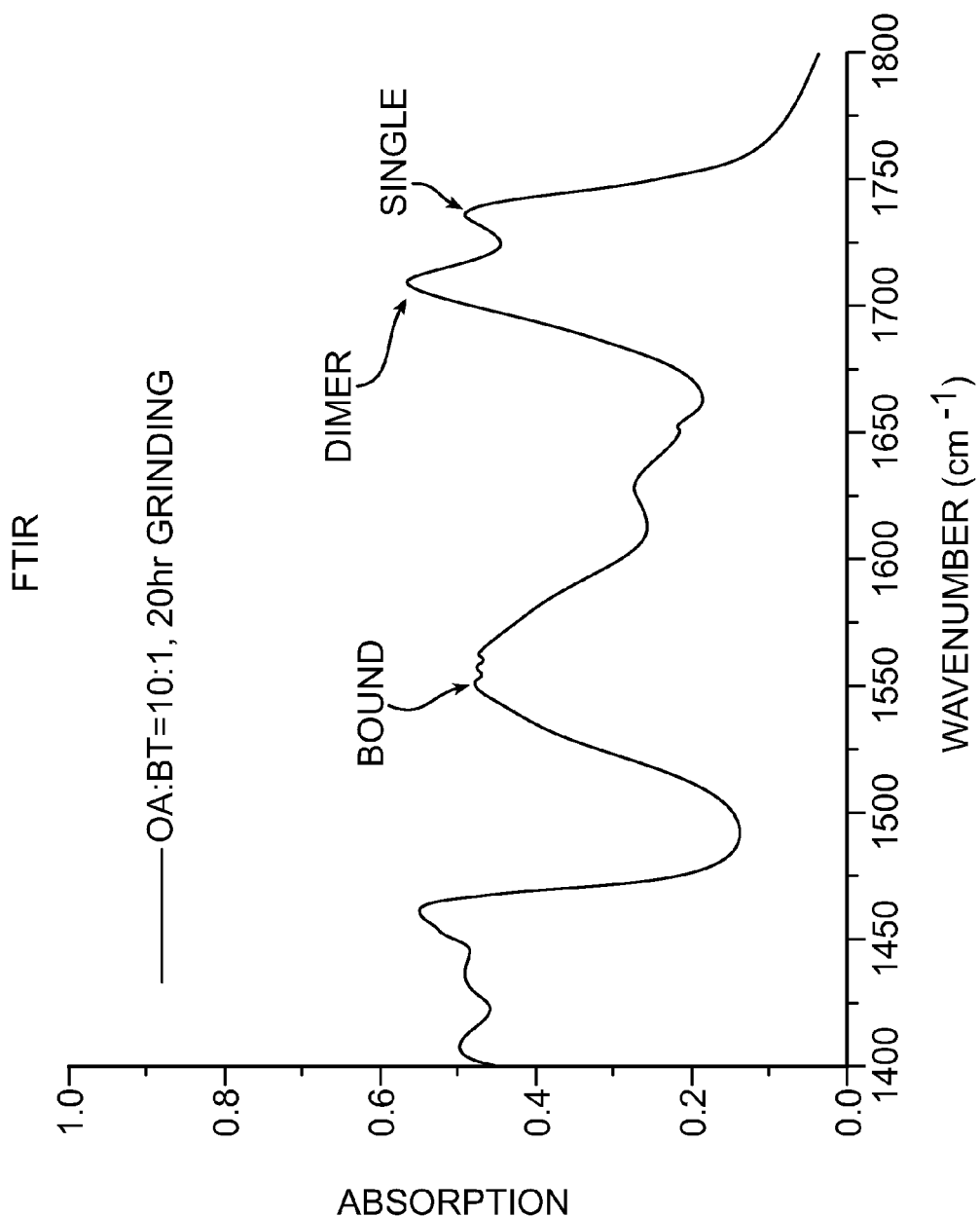
FIG. 3 is a graph showing IR absorption for a particle dispersion such as shown in FIG. 2.

As seen in FIG. 2, the surfactant, such as oleic acid in a ferroelectric nanoparticle dispersion may be in three states, including, single oleic acid molecules at 100, dimer molecules as shown at 102 and bound at 104 and coating the ferroelectric nanoparticle, such as $BaTiO_3$ particles. As seen in FIG. 3, the three states are shown via Fourier Transform Infrared spectroscopy (FTIR) analysis of a dispersion having the states. In this example, the strong C=O stretch of oleic acid (OA) serves as a convenient probe for quantitative FTIR analysis. It is observed that the absorption peak of C=O appear at ~1708 $cm^{-1}$, ~1750 $cm^{-1}$, and ~1500-1600 $cm^{-1}$ when oleic acid presents as a dimer, monomer, or complex conjugate with $BaTiO_3$. In the invention, the amount of surfactant included in the mixture is controlled to create and maintain the desired properties of the colloids, allowing reproducible colloids to be formed having the desired properties. A method accordingly relates to how to prepare optimized and reproducible colloids and how the use of optimized mixtures determines the largest influence of the nanoparticles on the electro-optics of liquid crystals. The invention contemplates the use of various ferroelectric materials. In an example, the method will be described with reference to the use of barium titanate ($BaTiO_3$). This material is used extensively in electronics and microelectronics owing to its excellent ferroelectric, piezoelectric and dielectric properties.

Example 1

In a more particular example, a ferroelectric material, such as barium titanate ($BaTiO_3$) (Aldrich, about <3 μm (less than 3 μm) powder), may be used. Comminution of the material may use any suitable system, such as a planetary ball mill (Retsch, PM200) to produce nanosized particles. The ferroelectricity of the purchased $BaTiO_3$ powder is confirmed by the Curie (ferroelectric to paraelectric) transition seen in DSC (Differential Scanning calorimetry) measurements. Upon grinding, samples comprised 1.0 g of $BaTiO_3$ powder, 1.5 g of oleic acid (as surfactant, 99.9%, Aldrich), 10 g heptane, pure ethyl alcohol or other suitable solvent (to act as liquid carrier, HPLC grade, Aldrich), and 100 g grinding balls (Retsch, yttrium-stabilized Zirconium oxide balls, 2 mm in diameter). These were placed into the grinding jar (Retsch, 50 ml jar with zirconium oxide interior). The mixture was milled at 500 rpm for a designated time (2 to 60 hours for example). The ground particle suspension can be directly spin coated on NaCl plate for FTIR analysis of the oleic acid distribution. The evaporation of the heptane solvent was provided by application of heat, and the ground particles were weighed.

Figure 4:
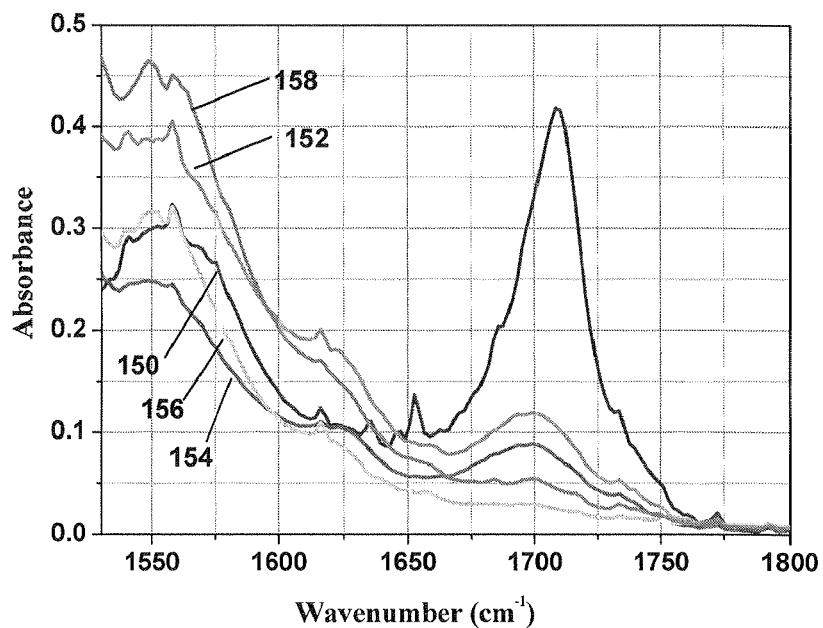
FIG. 4 is a graph of FTIR spectrum of various nanoparticle dispersions with different grinding times.

In the method of the invention, during comminution such as grinding, the particle size decreases and the total surface area of the ferroelectric nanoparticles increases. As a result, more oleic acid (or other surfactant) molecules can bond to the particles. In the example using OA as a surfactant, as shown in FIG. 4, quantitative FTIR analysis indicates different states of the OA in $BaTiO_3$ dispersions, with the absorption peak of C=O appearing at ~1708 $cm^{-1}$, ~1750 $cm^{-1}$, and ~1500-1600 $cm^{-1}$ when oleic acid presents as a dimer, monomer, or complex conjugate with $BaTiO_3$ respectively. Each of the dispersions shown in FIG. 4 has the same OA to BT ratios (1.5:1.0), but has been subjected to different grinding times. More specifically, curve 150 shows the FTIR analysis for a dispersion ground using a planetary ball mill as will be hereafter described in more detail for 5 hours, curve 152 for 10 hours, curve 154 for 15 hours, curve 156 for 20 hours and curve 158 for 25 hours. As seen in this Figure, the grinding time of 5 hours produces a large peak at ~1708 $cm^{-1}$n indicating the presence of OA as a dimmer, with increased grinding times producing larger peaks at ~1500-1600 $cm^{-1}$ when more OA is bound to the BT and reducing the free OA peaks simultaneously. Thus, during grinding, the particle size decreases and the total surface area increases, and more oleic acid molecules bond to the particle so the ~1550 $cm^{-1}$ absorption ($A_{1550}$) increases while the ~1708 $cm^{-1}$ dimeric absorbance ($A_{1708}$) decreases, as shown in FIG. 4.

Figure 5:
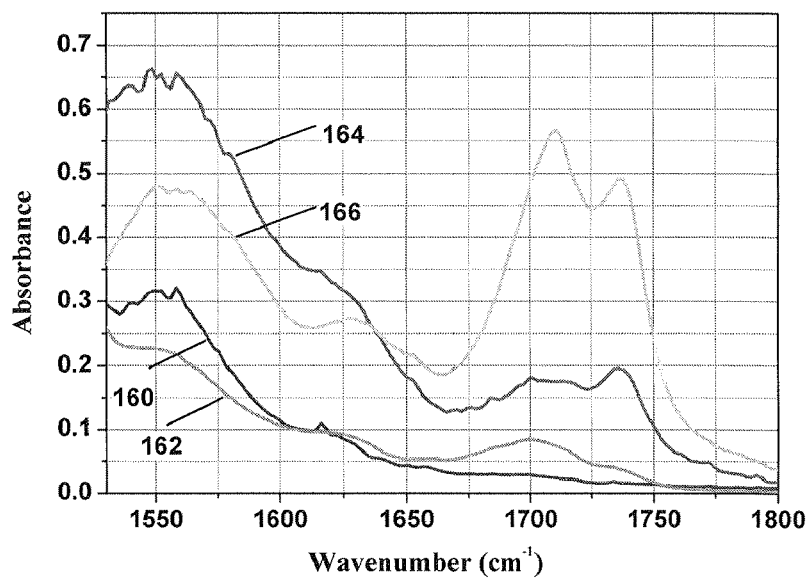
FIG. 5 is a graph of FTIR spectrum of various nanoparticle dispersions with different OA and BT ratios.

Alternatively, for dispersions which are subjected to the same grinding times, different OA concentrations produce results as shown in FIG. 5. In this example, each dispersion was subjected to 20 hours of grinding, but curve 160 shows absorption for an OA:BT ratio of 1.5:1.0, curve 162 for a ratio of 2.0:1.0, curve 164 for a ratio of 3.0:1.0 and curve 166 for a ratio of 10.0:1.0. As indicated, the samples 164 and 166 containing more oleic acid have more free OA left in the suspension, and shows stronger A1708 absorbance as seen in FIG. 5.

Figure 6A:
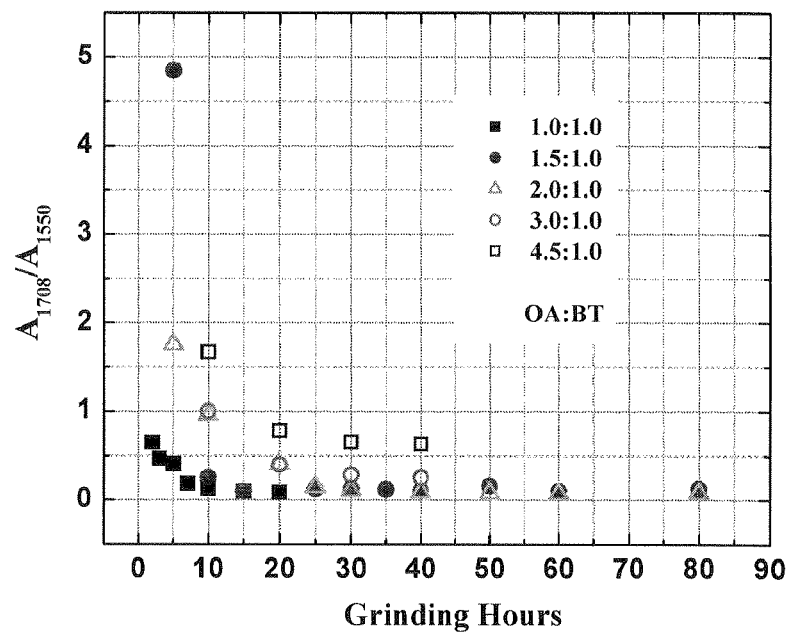
FIGS. 6A and 6B are graphs of OA and BT ratio to grinding times showing absorbance ratio of free vs bonded OA and absorbance of bonded vs total OA.
Figure 6B:
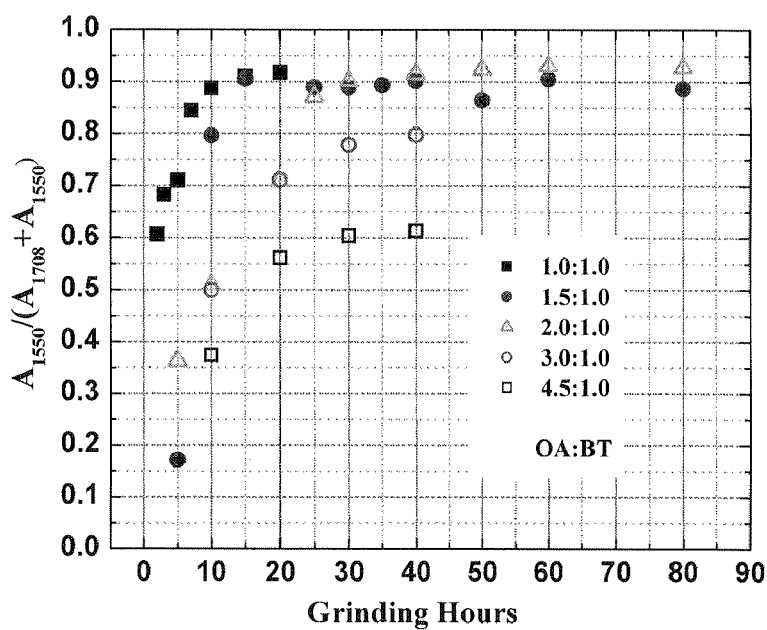
Figure 7:
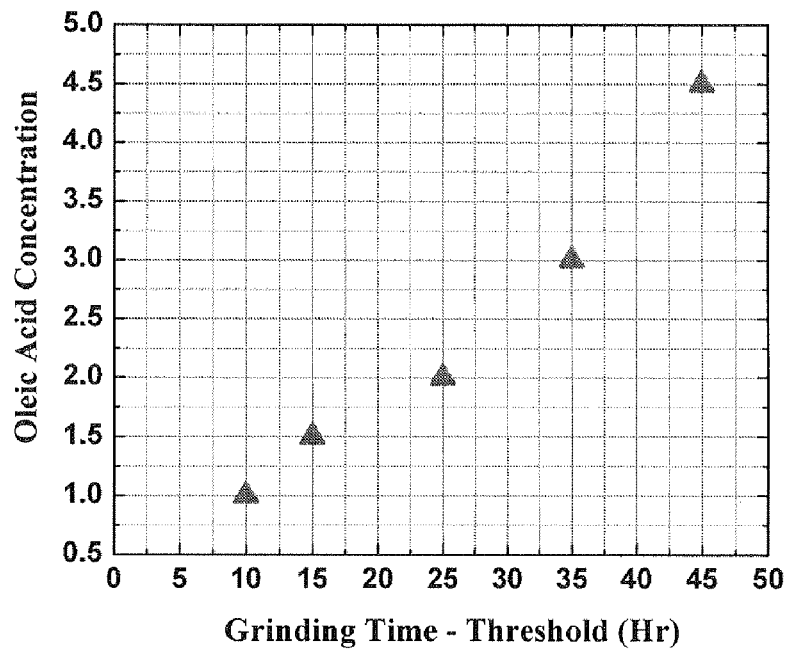
FIG. 7 is a graph of OA concentration to grinding time, showing the relationship between the grinding time for all OA bonded to the particle surfaces and the OA to BT ratio.

Turning to FIG. 6A, the ratio of the two absorbance $A_{1708}/A_{1550}$ vs grinding time and OA concentration provides an indication of the distribution of OA more clearly. In FIG. 6A, the results of dispersions having a ratio of the OA:BT of 1:1, 1.5:1, 2.0:1, 3:1 and 4.5:1 are shown. As seen in this Fig., for an OA:BT=1.5:1, the $A_{1708}/A_{1550}$ ratio decreases with grinding time reaching a minimum after ~15 hours of milling. This indicates that all the oleic acid molecules are bound to the BaTiO3 after 15 hours. Similarly, as shown in FIG. 6B, the ratio of $A_{1550}/(A_{1708}+A_{1550})$ for the same different dispersions shown in FIG. 6A indicate an increase with grinding and saturation after 15 hours for an OA:BT=1.5:1.0. As seen in FIG. 7, the relationship between the grinding time to the point where all oleic acid is bonded to the particle surface, or the saturation time for each OA concentration indicates the saturation increases with OA concentration since more time is needed to reduce particle size in order to accommodate all the OA molecules.

Figure 8:
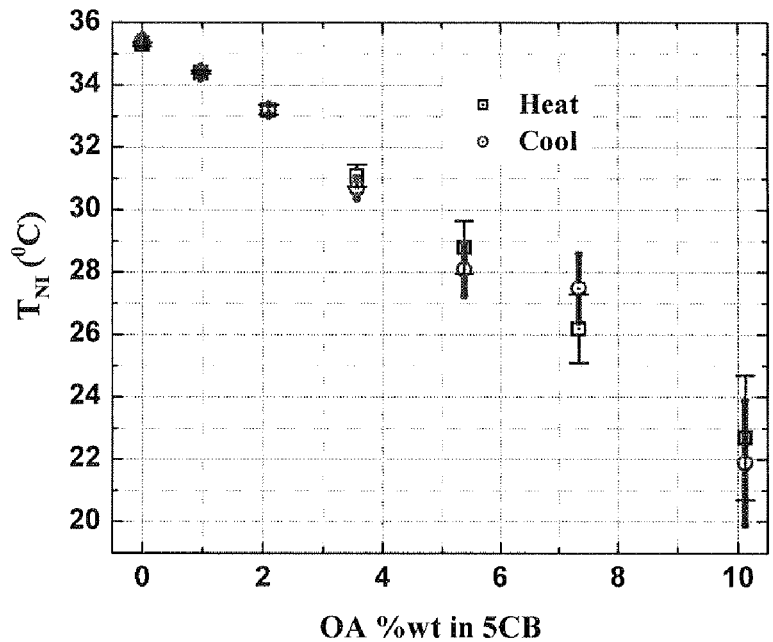
FIG. 8 is a graph showing the clearing point to the OA weight percent in a liquid crystal host.
Figure 9:
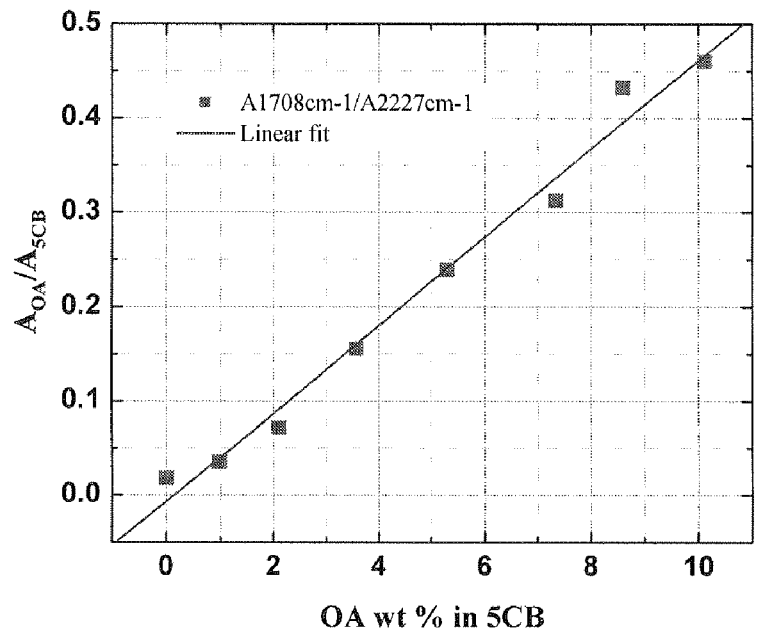
FIG. 9 is a graph showing the dependence of free OA and LC IR absorption ratio on the OA weight percent in a host liquid crystal.
Figure 10:
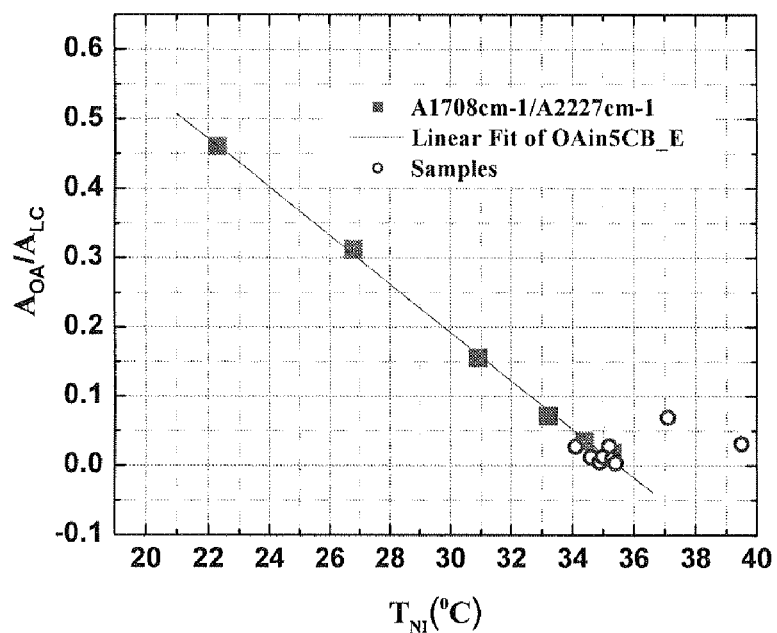
FIG. 10 is a graph showing the relationship between free OA and LC IR absorption ratio and the clearing point of the LC/OA mixture along with results of previous samples.
Figure 11A:
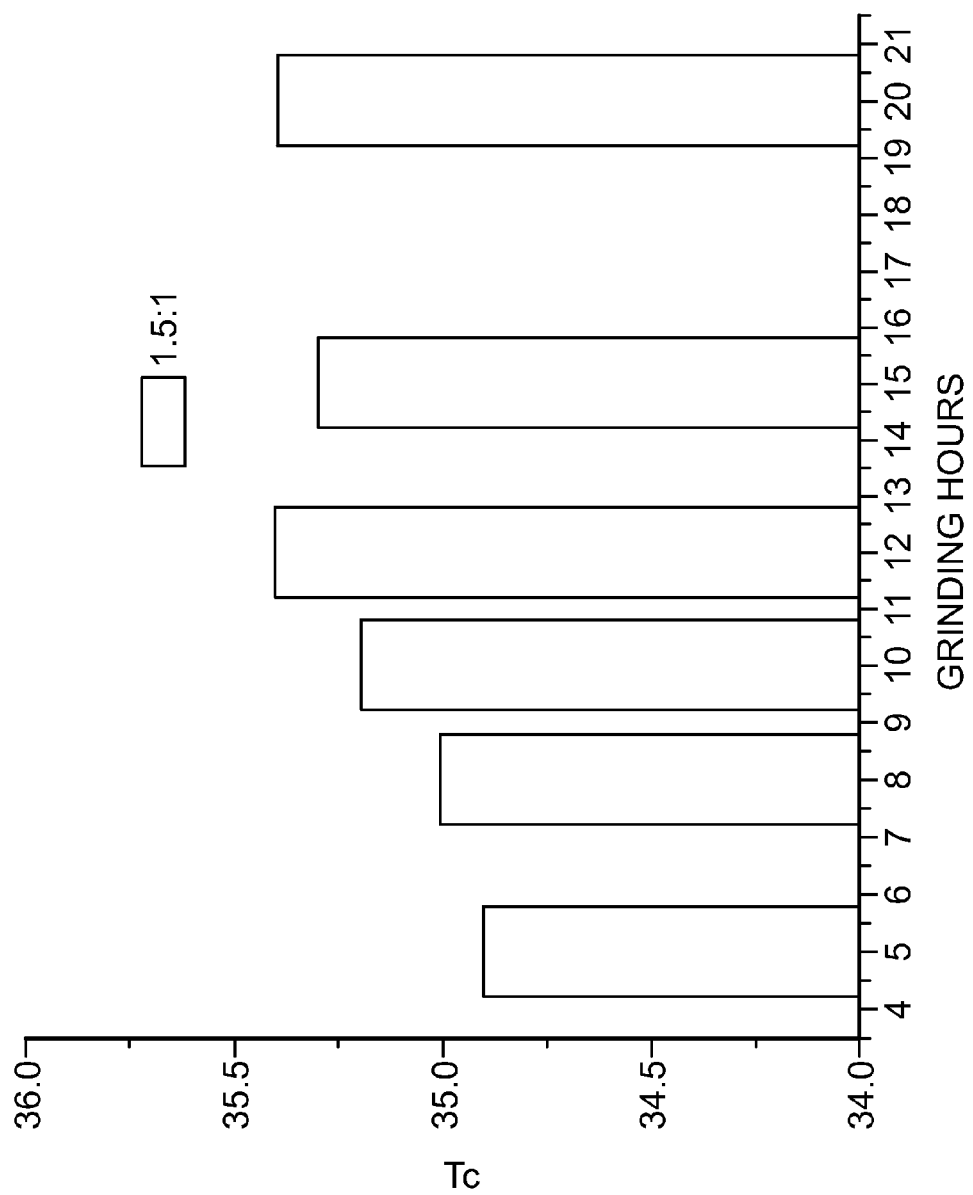
FIGS. 11A and 11B show graphs of clearing points of LC ferroelectric dispersion vs grinding hours of the ferroparticles.
Figure 11B:
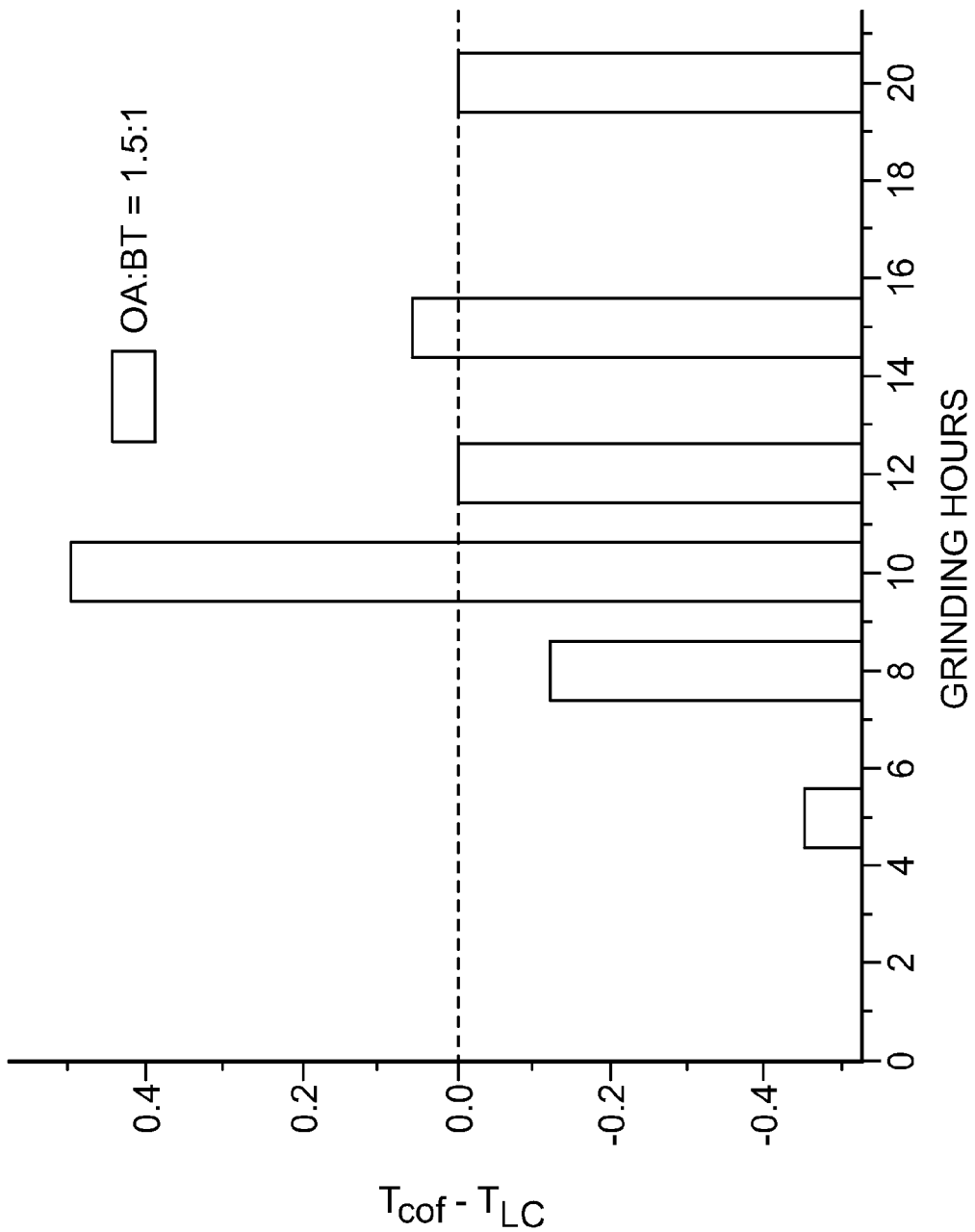

Because unbound (dimeric) oleic acid suppresses the liquid crystal order, the invention provides a method wherein the ground particle suspension of the surfactant coated ferroelectric material is designed to be dispersed with the liquid crystal host material at or after the saturation point. Thus, after grinding, the BaTiO3 particle suspension is mixed with liquid crystals with mechanical stifling at elevated temperature to evaporate the heptane. If the grinding time is shorter than the saturation point, the free OA in the liquid crystal will offset the effect of BaTiO3 particle. It is difficult to remove the excess amount of OA without introducing new impurities and removing ferroparticles. To evaluate the particle's effect in the LC host, FTIR method may be used to assess the free suspended OA in the liquid crystal mixture. In an example, a first step may be provided by dissolving a surfactant into a LC host material in different concentrations. In accordance with the above example, OA may be dissolved into a liquid crystal 4-n-pentyl-4'-cyano-biphenyl (5CB) (to provide a carbonyl stretch at 1708 $cm^{-1}$ for OA and cyano stretch at 2227 $cm^{-1}$ for 5CB) in different concentrations and measure IR absorption ratio of OA to 5CB and the clearing point of these mixtures. In an example, the results showing the dependence of clearing point to the oleic acid weight percent in 5CB liquid crystal are plotted in FIG. 8. The dependence of free oleic acid and 5CB IR absorption ratio on the oleic acid weight percent in 5CB liquid crystal is shown in FIG. 9. Combining FIGS. 8 and 9 provides a standard relationship between the IR absorbance Vs clearing point of OA in 5CB, as shown in FIG. 10. This standard curve serves as a measure of the effect of pure OA in 5CB in the phase transition temperature. The Tc and IR of BaTiO3 containing 5CB may then be measured and added to the graph as samples in FIG. 10. The horizontal distance between the particle mixtures to the standard curve gives the particles effect. We used the standard curve of Tc Vs IR absorbance ratio to analyze some of our samples, as shown in FIGS. 11A and 11B. FIG. 11A shows experimentally measured clearing points of 5CB ferroelectric dispersions vs grinding hours of the ferroparticles, while FIG. 11B shows corrected clearing points for the dispersions. It is clear that after the correction for OA's effect, the particle ground for 10 hours shows very strong effect in this set of the samples, which provides an indication of the dispersion that may be prepared for use in different applications.

Figure 12:
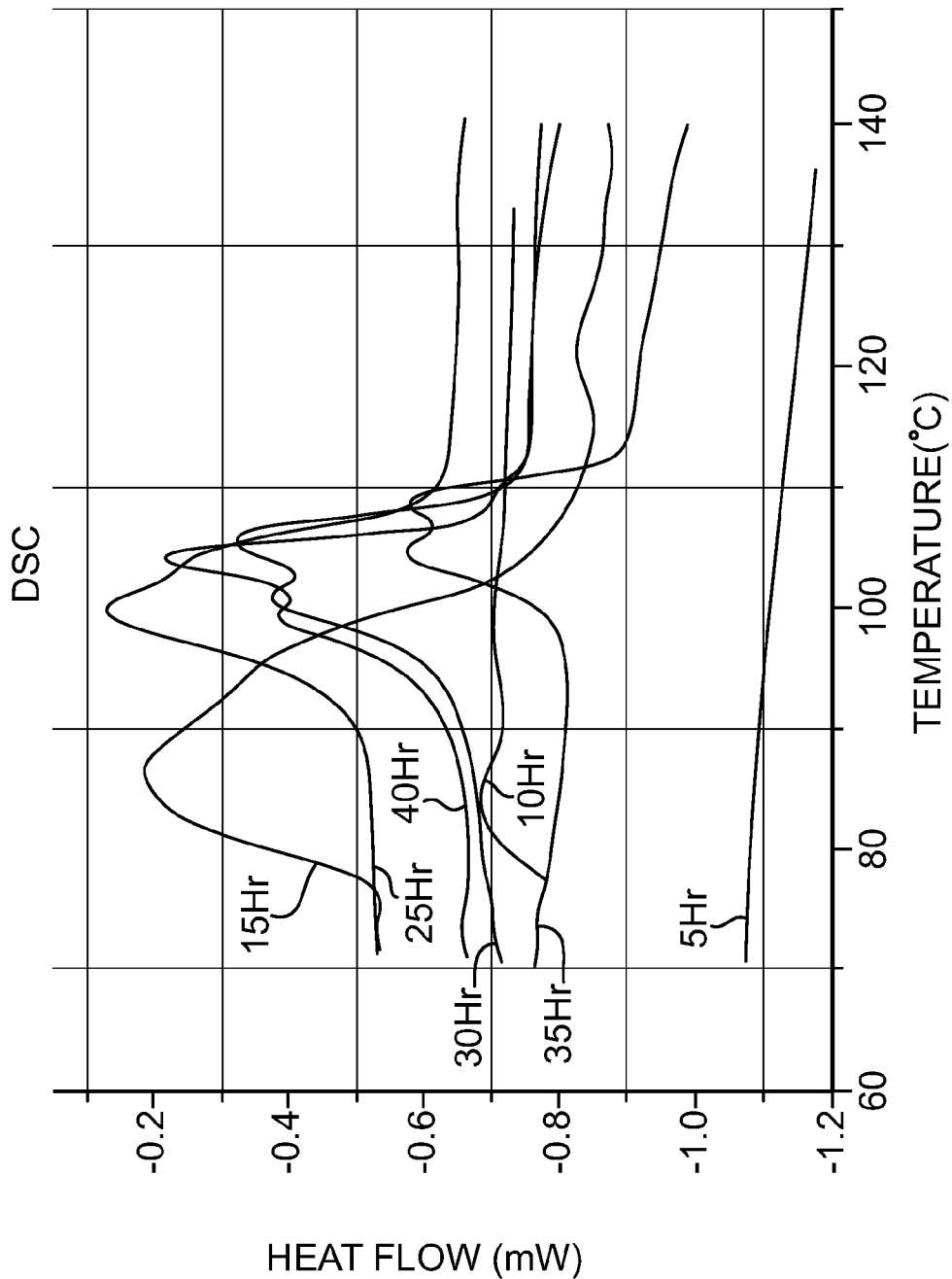
FIG. 12 is a graph of differential scanning calorimetry measurements showing heat flow to ferroelectric nanoparticles for different grinding times.
Figure 13:
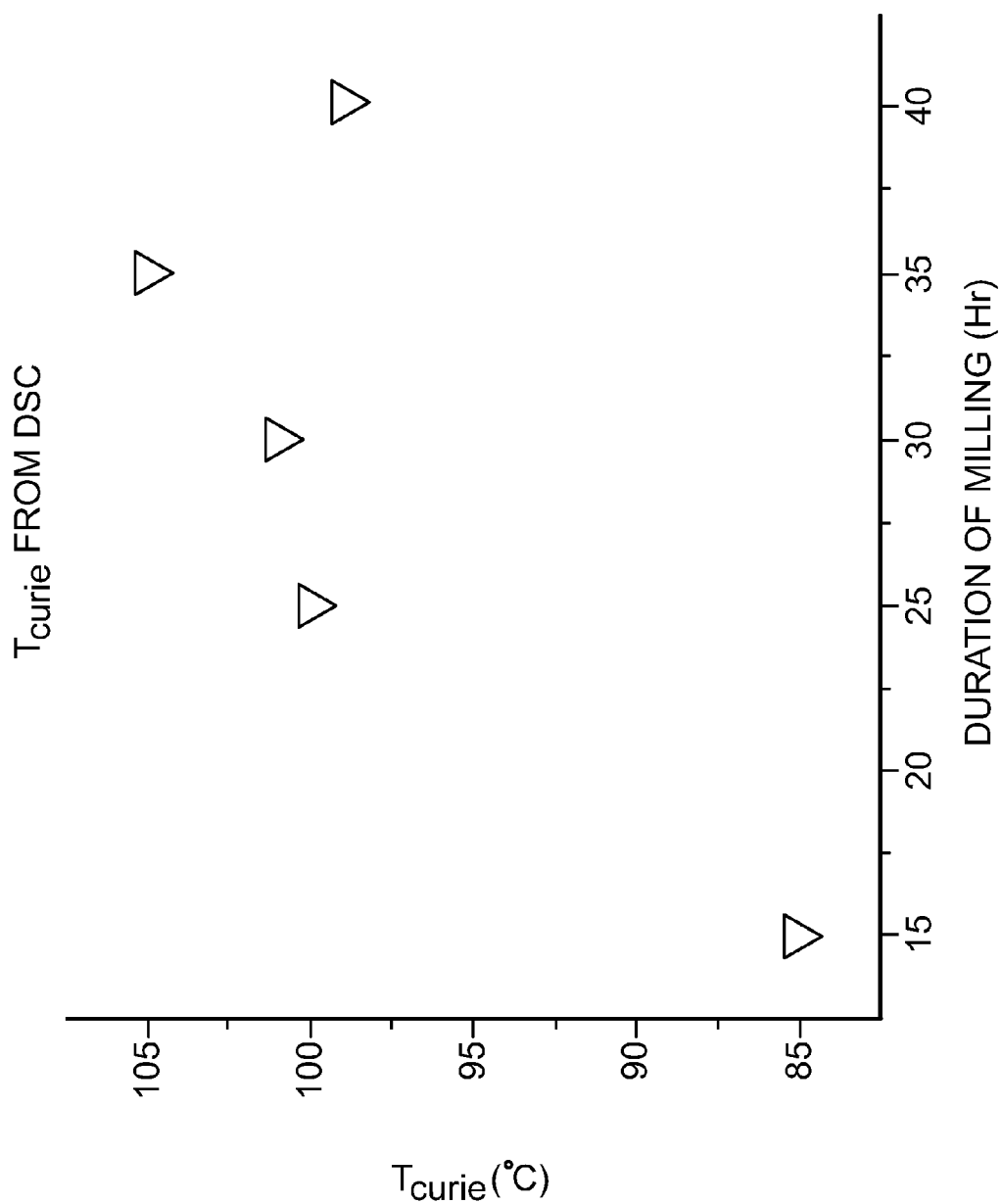
FIG. 13 is a graph of Curie transition temperature from differential scanning calorimetry measurements for ferroelectric nanoparticles for different grinding times.

It is also desired to maintain the nanoparticles ferroelectricity, which is provided by the addition of surfactant during the grinding process, as ferroelectricity can be quickly destroyed by high energy ball milling for example, if no surfactant is present. The invention therefore optimizes both the milling time (to achieve small particle size and narrow size distribution) and surfactant concentration (to maintain the ferroelectricity during milling). The ferroelectricity of the nanoparticles was assessed based on the Curie transition in the DSC measurements. Using DSC, direct analysis of the Curie transition of the ferroelectric to paraelectric phase may be monitored. As seen in FIG. 12, the DSC analysis of $BaTiO_3$ particles ground for different times are shown, with FIG. 13 showing DSC analysis for the relationship between the curie transition temperature peak and the grinding time. As seen in these Figs, the $T_{Curie}$ first increases with milling, then reaches its peak value and declines after further milling. It is also clear that the Curie transition peak become more prominent and narrower as $T_{Curie}$ is higher. In this example, the $T_{Curie}$ peaks at ~35 hours of milling, which is different with the saturation point for oleic acid coverage shown and described with reference to FIG. 11. The invention relates to optimizing both $T_{Curie}$ with oleic acid simultaneously.

The method allows characterization of ferroelectric particle dispersions to provide desired properties in conjunction with a LC host material. The FTIR study allows characterization of different states of an added surfactant, such as with OA, the C=O stretching band from dimeric, monomeric and conjugated oleic acid. A similar approach may be used with other surfactants to effectively identify and quantify the status of the surfactant in a dispersion. Further, the effect of the surfactant can be evaluated using a standard relationship between IR absorbance and the clearing point, allowing derivation of the particle's influence on a liquid crystal's phase transition temperature without removing the excess surfactant in the liquid crystal. Using both FTIR and DSC, the surfactant concentration may be controlled along with parameters such as particle size and particle ferroelectricity, to produce the predetermined effect defined by the point where the surfactant, such as oleic acid, is present in an amount to produce the desired effects when combined with a LC host.

With many ferroelectric nanoparticles and surfactant combinations, the concentration of the surfactant is desired to just cover the entire particle surface and protect ferroelectricity. The amount of the surfactant may be determined to achieve the desired results in association with a particular material and particle size or size range. Once the procedure is established for a given material and predetermined size or size range, the process is repeatable. Nanoparticle preparation and colloidal stability are achieved for a given system of nanoparticles/surfactant/LC host. As was described in the example of a system of $BaTiO_3$ particles/oleic acid, a predetermined amount of $BaTiO_3$ material was mixed with oleic acid and heptane, and was ground in the mill for a predetermined time. The variables include the relative concentration of BaTiO3 to oleic acid. Further, the amount of heptane as an isotropic carrier can be varied in such a way to achieve a predetermined final mass concentration of the nanoparticles in the heptane/$BaTiO_3$ particles/oleic acid colloid. In an example, a final mass concentration was ~4.5 wt %. The time of grinding can be varied from very small (minutes) to many hours (such as ~60 hours), and various milling speeds may be used, such as ranging from 60 rpm to 500 rpm. Particle sizes and the way they sediment in heptane are different for different milling times. The particles can aggregate and sediment to the bottom of a vial with short milling times, while being suspended in heptane for intermediate milling times and forming a gel-like structure for longer milling times. Since the material's composition is the same, the structural changes are the results of the size of the particles only, coupled with the degree of their ferroelectricity. In association with the method, the preparation of the nanoparticles to provide relatively uniform size and morphology is carried out. Along with providing the other characteristics as described, this provides colloidal stability as desired.

The method includes forming ferroelectric nanoparticles of a predetermined size or narrow size range for a particular application and material. In the example of the use of $BaTiO_3$ nanoparticles, the method contemplates the production of the predetermined size particles by any suitable comminution system and method. There are many different ways to produce $BaTiO_3$ nanoparticles of this material. For example, a number of chemistry-based processing routes have been developed for the production of fine and homogeneous $BaTiO_3$ powders. These include coprecipitation, solgel processing, hydrothermal synthesis, reactions in molten salts, processing from polymeric precursors, and oxalate and citrate routes for example, and other techniques. However, analysis of data shows that the degree of success in all these above-described processes varies considerably from one technique to another. The resulting powder very often consists of coarse particles with a wide particle size distribution, irregular particle morphology and/or a high degree of particle agglomeration. In the invention, it is desired to provide ferroelectric nanoparticles that have relatively uniform particle size distribution of a desired size, relatively similar particle morphology and/or minimized particle agglomeration. According to an example, $BaTiO_3$ materials were prepared to achieve these results, such as by the conventional solid reaction between $BaCO_3$ and $TiO_2$ in an equimolar ratio at temperatures >1200° C., available from Aldrich in all varieties of initial sizes. In order to prevent sedimentation in a gravitational field, the thermal energy of the particles should exceed their potential energy. For $BaTiO_3$ this yields a critical radius of about ~10 nm. For $BaTiO_3$ or other ferroelectric materials, it is also desired to have particle sizes that maintain the ferroelectricity of the particles. In the case of $BaTiO_3$, the size below which the crystal structure changes from a tetragonal phase to a cubic one with no spontaneous polarization has been reported to be from 9 to 110 nm.

Even if not ferroelectric, these small particles (approximately ~10 nm) would tend to aggregate together and fall out because of attractive van der Waals forces. In the case of ferroelectric particles there will be additional electrostatic forces. Therefore, in order to prevent agglomeration and segregation, the particles are coated with a film of a dispersing agent that prevents agglomeration. In order to facilitate the result that the surfactant molecules completely cover the particles, the dispersing agent according to an example is added to the larger size powder or even the solid material before the milling procedure starts. The surfactant adsorbs on the surface of the particles during grinding, and minimizes cold welding between powder particles to further inhibit aggregation or agglomeration.

In this example, the ferroelectric nanoparticles of BaTiO3 with an initial size of about ~3 μm are used as a starting material. Then, particles of different sizes are produced by a high-energy milling process or other suitable process. Other starting sizes for the material may be used, but it may be worthwhile to have a starting size that is smaller than the grinding ball size in a ball milling process for example. In a ball milling process for example, it has been found that the particle size decreases approximately exponentially with grinding time and reaches micron sizes quickly, with additional reduction of particle size then proceeding more slowly upon further milling. Providing an isotropic carrier liquid along with the dispersing agent or surfactant, such as heptane or pure ethyl alcohol, allows the molecules of the dispersing agent to attach a polar group to the dispersing agent, while the motion of the non-polar tails of the molecules builds up a repulsive force between the ferroelectric particles. In this example, the oleic acid dispersing agent attaches as previously described and as shown in FIG. 2, to the $BaTiO_3$ particles to fully coat the particles. Other dispersing agents and/or ferroelectric particles may be used which would provide a similar result.

Figure 14:
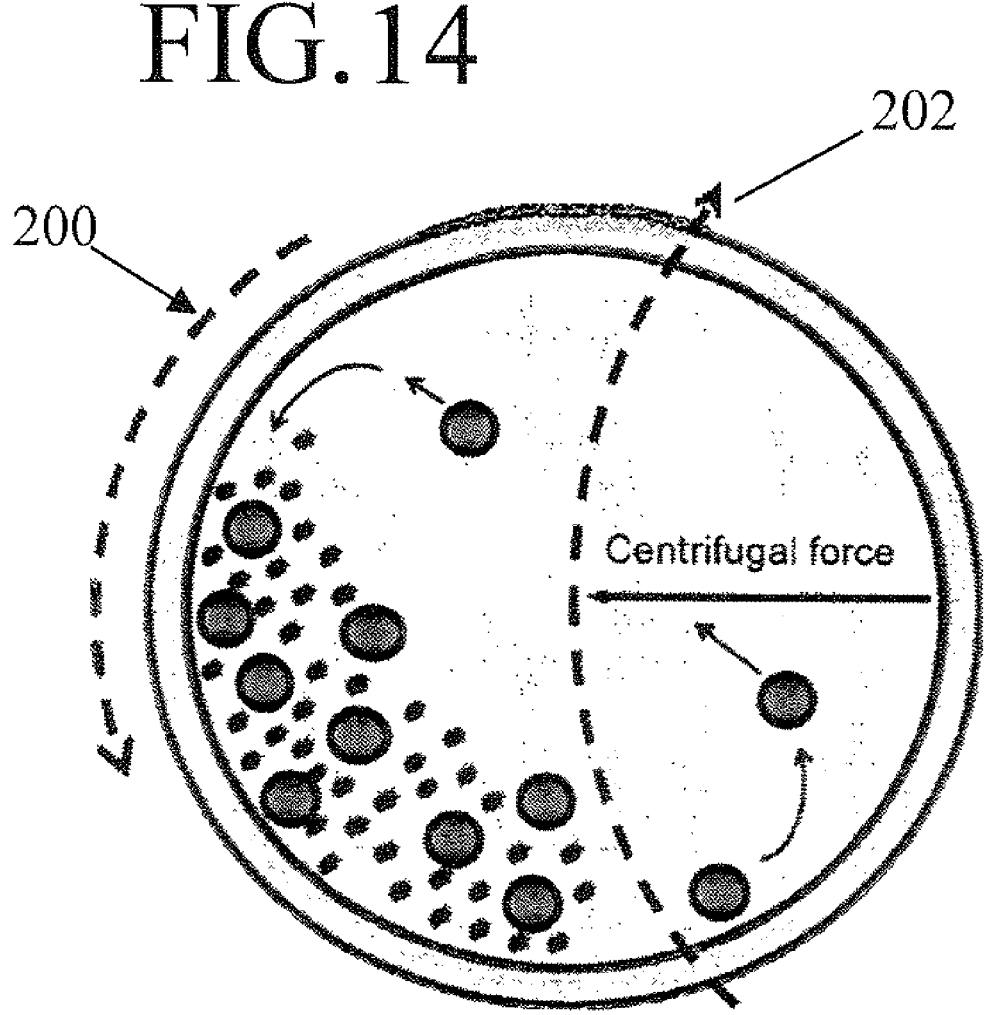
FIG. 14 is schematic illustration of a grinding system according to an example.

To facilitate production of predetermined sized nanoparticles of a ferroelectric material, different types of high-energy milling or other suitable equipment is available to produce micro- and nanopowders. The equipment may differ in its capacity, efficiency of comminuting and additional systems for cooling, heating, etc. Any suitable system for comminution of the materials to provide desired nanoparticles is contemplated. In an example as mentioned, a planetary ball mill, such as a two station PM200 planetary ball mill manufactured by Retsch GmbH (Germany), is suitable to reduce the size of particles of $BaTiO_3$ material. Such a mill provides a planet-like movement of a plurality of jars arranged on a rotating support disk or sun disk. A special drive mechanism causes them to rotate around their own axes as shown in FIG. 14, wherein arrow 200 shows the direction of rotation of a grinding jar, and arrow 202 shows the direction of rotation of the base disk. The grinding jar rotates about its own axis and in the opposite direction, around the common axis of the disk or sun wheel. The superimposition of the centrifugal forces produces grinding ball movements with a high pulverization energy. The centrifugal forces acting on the grinding jar wall initially carry the grinding balls in the direction in which the grinding jar is rotating. Differences occur between the speed of the grinding jar wall and the balls, which results in strong frictional forces acting on the ferroelectric material. As the rotational movement increases, Coriolis forces act on the balls to displace them from the grinding jar walls. The balls fly through the grinding jar interior and impact against the sample on the opposite grinding jar wall. This releases considerable dynamic impact energy. The combination of the frictional forces and impact forces causes the high degree of size reduction of the material. In such mills, such as the PM200 milling machine, the disk and the jar or vial rotation speeds can be independently controlled to obtain desired results. Other types of mills or comminution systems may also be used to achieve the desired ferroelectric nanoparticles with the surfactant or dispersing agent coated thereon.

In use of a milling system, such as described, in preparation of the ferroelectric nanoparticles, variables such as type of mill (i.e., planetary ball mill, shaker mill, two roll mill, jet milling, etc.); milling container (if any); milling speed; milling time; type; size and size distribution of the grinding medium (if any); ball-to-powder weight ratio (if any); extent of filling the jar; process control agent; temperature of milling and other parameters may be controlled to achieve the desired size or narrow size range of nanoparticles. The times needed to reach a certain size vary depending on the intensity of milling, the ball-to-powder ratio and the temperature of milling. These times have to be decided for each combination of the above parameters and for the particular powder system. It is desirable to achieve parameters for a particular system that provide grinding of the ferroelectric material for not longer than necessary to provide the desired size range. Other factors that can affect the size reduction capabilities and efficiency of the milling system may include the size of the grinding medium. Generally, a large size (and high density) of the grinding medium is useful since the larger weight of the balls will transfer more impact energy to the powder particles, such as for example balls of 1 mm in diameter, and formed of the same material as the jars. The ratio of the weight of the balls to the powder is another variable in the milling process, and can be from a value as low as 1:1 to as high as 300:1 for example, with examples using a ratio of 100:1. Additionally, efficiency can be affected by the space within a milling jar for the balls and the powder particles to move around freely in the milling jar. Therefore, the extent of filling the milling jar with the powder and the balls can be varied. A balance between providing a desired production rate to allowing sufficient movement of the balls and powder is generally selected, such as about 50% filling. A surfactant is added to the powder mixture before milling to reduce the effect of aggregation of the nanoparticles. The surfactant adsorbs on the surface of the powder particles and minimizes cold welding between powder particles and thereby prevents agglomeration.

Other techniques, such as particle size separation processes may be performed to obtain the desired size range. Such techniques may include air separation or cyclone techniques, or other suitable systems.

Also for consideration depending on the comminution method may be the incorporation of contaminants. For example, in a planetary ball milling system, the material used for the milling jars may cause material from jar to be introduced into the powder due to the impact of the BaTiO3 particles or balls on the inner walls of the container. This can contaminate the powder or alter the chemistry of the powder in an undesirable fashion if not controlled. In an example, jars formed of partially stabilized zirconia+yttria may be used, as such material has a hardness that is several orders of magnitude larger than that of $BaTiO_3$.

In this example of use of a planetary ball milling system, or other systems, the coating of the nanoparticles with the dispersing agent, oleic acid, is achieved during milling, such that the molecules of the dispersing agent attach their polar group to the $BaTiO_3$ surface while the non-polar tails facilitate maintaining the particles in a dispersed state. It is also desired to avoid degradation of the ferroelectric material that can occur from the temperature during comminution becoming too high.

Thus according to the invention, the method develops comminution or grinding conditions for a particular ferroelectric material, and then characterizes the concentration of a surfactant to provide the desired effects when combined with a LC host material. Once the procedures are established for a particular combination of ferroelectric material, surfactant and LC host, the results are repeatable.

The following theoretical estimation expresses the dependence of the ratio of the amount of the surfactant to the amount of the ferroelectric material as a function of the particle size. The estimation assumes that the optimal concentration of oleic acid is that which covers each particle with a monolayer of thickness h. If the particles' material density is ρ and particles' radii are R, the total weight (mass) of a particle is:

$$M_{particles} = 4\pi/3 R^3 \rho$$

If the oleic acid density is $\rho_{acid}$ and the thickness of the oleic acid layer at a particle surface is h, the total weight (mass) of the oleic acid that covers the particle surface is $$M_{acid} = 4\pi R^2 h \rho_{acid}$$

The ratio of the total particles' mass to the oleic acid mass is given by $$M_{acid}/M_{particles} = 3/R \, h \rho_{acid}/\rho_{particles} \sim 1/R$$

The particles' average radii dependence on the grinding time can be given by $1/R \sim T_{grinding}$. As obtained from TEM analysis as shown in FIG. 15, leading to the result that the concentration of the surfactant is a linear dependence on the milling time. With such an estimation, the concentration of the surfactant may be selected and further analysis conducted as described to provide an optimized result for a certain size of nanoparticles.

As was described previously, the preparation of ferroelectric colloids using nanoparticles in association with at least one surfactant can provide enhanced functionality to the LC host into which the colloid is dispersed. The ferroelectric colloids can increase the liquid crystal phase transition temperatures, influence the order parameter and thereby birefringence characteristics, viscosity, elastic constants, and dielectric anisotropy for example. The properties of existing liquid crystal materials may thus be modified for various applications, which may improve the performance of liquid-crystal-based optical devices (liquid crystal displays and light modulators) making them operate faster and at lower driving voltages. For example, the addition of ferroelectric colloids to cholesteric liquid crystals used in bistable cholesteric displays can increase the display's brightness and contrast. It has also been found that other benefits, such as that the liquid crystal two-beam coupling gain in photorefractive hybrids reverses its sign and increases in magnitude through the addition of ferroelectric BaTiO3 nanoparticles, can yield gain coefficients up to 1100 $cm^{-1}$ in the Bragg regime. Various other properties of the liquid crystals/ferroelectric nanoparticles colloids may also be realized.

Although the invention has been shown and described in conjunction with examples thereof, the same are considered as illustrative and not restrictive, and that all changes and modifications that come within the spirit of the invention described by the following claims are within the scope thereof.

What is claimed is:

1. A method for producing a ferroelectric nanocolloid liquid crystal dispersion comprising:
providing a predetermined amount of a ferroelectric nanoparticles, the ferroelectric nanoparticles having substantially a monomolecular film of a dispersing agent over at least a portion of the outer surfaces thereof, the dispersing agent having a polar group attached to the ferroelectric nanoparticles, and non-polar tails that create a repulsive force between the ferroelectric particles that facilitates preventing agglomeration between particles,
adding the predetermined amount of the ferroelectric nanoparticles to an amount of a liquid crystal host and mixing thereof to produce a ferroelectric nanocolloid liquid crystal dispersion.

2. The method of claim 1, wherein the ferroelectric nanoparticles are formed from comminution of a ferroelectric material for a predetermined time to form nanoparticles within a predetermined size range with a substantially similar morphology.

3. The method of claim 1, wherein the ferroelectric nanoparticles are formed from comminution of a ferroelectric material, and wherein the comminution is performed by a grinding process.

4. The method of claim 3, wherein the grinding process is carried out using a planeteary ball milling system.

5. The method of claim 2, wherein the formation of a film of a dispersing agent over at least a portion of the outer surfaces of the nanoparticles is performed during comminution.

6. The method of claim 3, wherein the grinding process is carried out on a dispersion of an amount of ferroelectric material, an amount of a dispersing agent and an amount of carrier liquid.

7. The method of claim 1, wherein the formation of a film of a dispersing agent over at least a portion of the outer surfaces of the nanoparticles is provided by determining the concentration of the dispersing agent for forming the film with substantially all of the dispersing agent in the state of being bound as a complex conjugate to the ferroelectric nanoparticles.

8. The method of claim 7, wherein the step of determining the concentration of the dispersing agent includes determining by FTIR analysis the amount of unbound dispersing agent in alternate dispersions formed by a predetermined ratio of the amounts of the dispersing agent and ferroelectric material that have been comminuted for different lengths of time, and FTIR analysis of the amount of unbound dispersing agent in alternate dispersions formed by a predetermined different ratios of the amounts of the dispersing agent and ferroelectric material that have been comminuted for the same time, with the ratio of the absorbance for bound and unbound dispersing agent compared to grinding time to provide an indication of the distribution of OA and therefrom determining the concentration and grinding time to produce the film.

9. The method of claim 8, further comprising performing DSC analysis after mixing of the alternate dispersions produced for determining the concentration of the dispersing agent to determine ferroelectricity of the nanoparticles by direct analysis of the Curie transition of the ferroelectric to paraelectric phase, to produce the predetermined effect defined by the point where the dispersing agent is present in an amount to produce the desired effects when combined with a liquid crystal host.

10. A method of determining the concentration of a dispersing agent in a dispersion formed with a ferroelectric nanoparticle material comprising,
providing an amount of ferroelectric material,
producing alternate dispersions formed of an amount of ferroelectric material, an amount of a dispersing agent and an amount of an isotropic carrier liquid,
comminuting the alternate dispersions for predetermined times to form nanoparticles,
determining by FTIR analysis the amount of unbound dispersing agent in alternate dispersions formed by a predetermined ratio of the amounts of the dispersing agent and ferroelectric material that have been comminuted for different lengths of time to form nanoparticles, and FTIR anaylsis of the amount of unbound dispersing agent in alternate dispersions formed by a predetermined different ratios of the amounts of the dispersing agent and ferroelectric material that have been comminuted for the same time, with the ratio of the absorbance for bound and unbound dispersing agent compared to grinding time to provide an indication of the distribution of dispersing agent relative to length of comminution time, and determining therefrom the concentration and grinding time to produce a film of a dispersing agent over the outer surfaces of the nanoparticles with substantially all of the dispersing agent in the state of being bound as a complex conjugate to the ferroelectric nanoparticles.

11. The method of claim 10, further comprising performing DSC analysis after mixing of the alternate dispersions produced for determining the concentration of the dispersing agent with a liquid crystal host to determine ferroelectricity of the nanoparticles by direct analysis of the Curie transition of the ferroelectric to paraelectric phase, to produce the predetermined effect defined by the point where the dispersing agent is present in an amount to produce the desired effects when combined with a liquid crystal host.

12. The method of claim 11, wherein mixing of the alternate dispersions is performed at an elevated temperature to cause evaporation of the liquid carrier.

13. The method of claim 10, wherein producing the ferroelectric nanoparticles includes comminution of a ferroelectric material for a predetermined time to form nanoparticles within a predetermined size range with a relatively similar morphology.

14. The method of claim 10, wherein the comminution is performed by a grinding process.

15. The method of claim 14, wherein the grinding process is carried out using a planeteary ball milling system.

16. A method for producing a ferroelectric nanocolloid liquid crystal dispersion comprising:
providing ferroelectric nanoparticles having at least one surfactant thereon, wherein the molecules of the at least one surfactant facilitate preventing agglomeration between particles,
adding the predetermined amount of the ferroelectric nanoparticles to an amount of a liquid crystal host and mixing thereof to produce a ferroelectric nanocolloid liquid crystal dispersion .

17. The method of claim 16, wherein the at least one surfactant is oleic acid.

18. The method of claim 16, wherein the amount of the at least one surfactant is controlled to create and maintain predetermined properties in the colloid dispersion.

19. The method of claim 16, wherein producing the ferroelectric nanoparticles includes comminution of a ferroelectric material for a predetermined time to form nanoparticles within a predetermined size range with a relatively similar morphology.

20. The method of claim 16, wherein the at least one surfactant forms a film over the outer surfaces of the nanoparticles.

* * * * *